US011410299B2

United States Patent
Turov et al.

(10) Patent No.: US 11,410,299 B2
(45) Date of Patent: Aug. 9, 2022

(54) SYSTEM AND METHOD FOR COUNTERACTING UNMANNED AERIAL VEHICLES

(71) Applicant: AO Kaspersky Lab, Moscow (RU)

(72) Inventors: Vladimir E. Turov, Moscow (RU); Vladimir Y. Kleshnin, Moscow (RU); Alexey O. Dorokhov, Moscow (RU); Andrey A. Vankov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 223 days.

(21) Appl. No.: 16/791,627

(22) Filed: Feb. 14, 2020

(65) Prior Publication Data
US 2021/0097664 A1  Apr. 1, 2021

(30) Foreign Application Priority Data
Sep. 30, 2019 (RU) .......................... RU2019130604

(51) Int. Cl.
| | | |
|---|---|---|
| *G06K 9/00* | (2022.01) | |
| *G06T 7/00* | (2017.01) | |
| *G08G 5/00* | (2006.01) | |
| *G06N 3/08* | (2006.01) | |
| *B64C 39/02* | (2006.01) | |

(52) U.S. Cl.
CPC .......... *G06T 7/001* (2013.01); *G08G 5/0013* (2013.01); *G08G 5/0026* (2013.01);
(Continued)

(58) Field of Classification Search
CPC .......... G06T 7/001; G06T 2207/20081; G06T 2207/20084; G06T 2207/30264;
(Continued)

(56) References Cited

U.S. PATENT DOCUMENTS

| | | | | |
|---|---|---|---|---|
| 2017/0092138 A1* | 3/2017 | Trundle | ............... | G08G 5/0069 |
| 2017/0192089 A1* | 7/2017 | Parker | ................. | G08G 5/0082 |

(Continued)

OTHER PUBLICATIONS

Hammer Marcus et al: "UAV detection, tracking, and classification by sensor fusion of a 360° lidar system and an alignable classification sensor", Enhanced and Synthetic Vision 2003 : [Conference Enhanced and Synthetic Vision 2002] ; Apr. 21, 2003, Orlando, Florida, USA; [Proceedings of SPIE ISSN 0277-786X], SPIE, US, vol. 11005, May 2, 2019 (May 2, 2019), pp. 110050E-110050E.
(Continued)

*Primary Examiner* — Dhaval V Patel
(74) *Attorney, Agent, or Firm* — ArentFox Schiff LLP; Michael Fainberg

(57) ABSTRACT

A method for detecting unmanned aerial vehicles (UAV) includes detecting an unknown flying object in a monitored zone of air space. An image of the detected unknown flying object is captured. The captured image is analyzed to classify the detected unknown flying object. A determination is made, based on the analyzed image, whether the detected unknown flying object comprises a UAV. In response to determining that the detected unknown flying object comprises a UAV, one or more radio signals exchanged between the UAV and a user of the UAV are suppressed until the UAV departs from the monitored zone of air space.

14 Claims, 7 Drawing Sheets

(52) U.S. Cl.
CPC .......... *G08G 5/0082* (2013.01); *B64C 39/024* (2013.01); *G06N 3/08* (2013.01); *G06T 2207/20081* (2013.01); *G06T 2207/20084* (2013.01); *G06T 2207/30264* (2013.01)

(58) Field of Classification Search
CPC . G06T 2207/10016; G06T 2207/10028; G06T 7/248; G08G 5/0013; G08G 5/0026; G08G 5/0082; G08G 5/006; G08G 5/0069; B64C 39/024; G06N 3/08; G06N 3/0454; G01S 17/66
See application file for complete search history.

(56) References Cited

U.S. PATENT DOCUMENTS

| | | | |
|---|---|---|---|
| 2017/0261999 A1 | 9/2017 | Van Voorst | |
| 2017/0278410 A1* | 9/2017 | Byers | H04W 84/06 |
| 2018/0128922 A1 | 5/2018 | Justice et al. | |
| 2018/0129881 A1* | 5/2018 | Seeber | B64C 39/024 |
| 2020/0064443 A1* | 2/2020 | Yoon | H04K 3/825 |
| 2020/0108924 A1* | 4/2020 | Smith | B64D 1/00 |

OTHER PUBLICATIONS

Hengy Sebastien et al: "Multimodal UAV 1-16 detection: study of various intrusion scenarios", Proceedings of SPIE; [Proceedings of SPIE ISSN 0277-786X vol. 10524], SPIE, US, vol. 10434, Oct. 5, 2017 (Oct. 5, 2017), pp. 104340P-104340P.

Kim et al, "V-RBNN Based Small Drone Detection Augmented Datasets for 3D Ladar Systems" Sensors, 2018, 18, 3825.

Al-Emadi et al. "Audio Based Drone Detection and Identification using Deep Learning", Department of Computer Science and Engineering, Qatar University, Conference Paper, Jun. 2019.

* cited by examiner

SYSTEM AND METHOD FOR COUNTERACTING UNMANNED AERIAL VEHICLES

CROSS-REFERENCE TO RELATED APPLICATION

This application claims benefit of priority under 35 U.S.C. 119(a)-(d) to a Russian Application No. 2019130604 filed on Sep. 30, 2019, which is incorporated by reference herein.

FIELD OF TECHNOLOGY

The present disclosure relates to the field of combating unmanned aerial vehicles (UAV), and, more specifically, to system and method for counteracting UAVs.

BACKGROUND

Unmanned vehicles are means of transportation outfitted with a system of automatic control which allow the unmanned vehicles to move without active and constant human intervention. Such unmanned vehicles may include, but are not limited to, unmanned ground transport (for example, an automobile), a self-propelled robot (for example, a lunar rover), and an unmanned aerial vehicle (for example, a quadcopter). The rapid development of complex unmanned (robotic) systems and devices requires new solutions for protection against them.

More specifically, UAVs, also known as drones, are becoming more available for purchase by individuals, resulting in a huge increase in their use by the public at large. Such UAVs represent civilian UAVs. The seemingly safe commercial and individual (private) use of UAVS may be associated with numerous dangers in the event of their improper operation. Such use may present risks to both life and property. Moreover, UAVs may be used to violate the sanctity of commercial, educational, athletic, recreational and government existence. UAVs, such as drones, may likewise be used to intrude on privacy or to carry out terrorist and criminal activities. For example, UAVs may fly into residential areas, carry explosives, or deliver contraband to prisoners by flying over prison grounds, for example. Therefore, there is a genuine need for an integrated system and method of detecting, tracking, identifying/classifying and deterring the UAVs, especially civilian UAVs. Examples of civilian UAVs include but are not limited to the drones of such companies as DJI, FREEFLY, PARROT and XIAOMI.

One of the solutions to the aforementioned problem is utilization of systems which use radio frequency detection (radar). However, such solutions have insurmountable difficulties in the detection and identification of small-sized flying objects. Due to the small size of the UAV (small unmanned aerial vehicle, SUAV) and their ability to fly at different altitudes and speeds, radar systems typically are not capable of assuring the necessary level of detection of the flying objects and their subsequent identification.

Another conventional solution to the aforementioned problem involves sensors, such as, for example, light identification, detection and ranging (LIDAR) devices. The advantage of LIDAR devices over radar is that they provide a more accurate determination of the location and have a smaller spot size, which enables a more accurate image of the target to be formed. Lidar is a device designed to detect, identify, and determine the range of objects using light reflections.

It should be noted that civilian UAVs are typically private property. The owners of the civilian UAVs might not know about the violation of privacy or the ban on crossing the boundaries of the air space of an object over which the UAV is flying. Therefore, the solutions for combating UAVs should effectively deal with the UAVs without actually damaging them.

Yet another criterion for consideration in designing solutions for combating UAV is that the use of civilian UAV typically occurs in the air space over population centers (cities, urban-type settlements, villages, etc.), which likewise imposes a number of restrictions on the acceptable means of counteracting UAVs. For example, it may be necessary for the counteracting solutions to take into account the proximity of various municipal structures and the use of various devices employing cellular networks of the municipal infrastructure.

Therefore, there is a genuine need to create a solution to effectively counteract any detected motion of unknown unmanned aerial vehicles in the monitored zone of an air space.

SUMMARY

Aspects of the present disclosure address the above described problems and shortcomings known in the art. Various aspects provide an integrated solution for the detection, classification, recognition and counteracting of unmanned aerial vehicles, especially civilian UAVs, without damaging them. Such integrated solution may be used in government, commercial, private and public interests. One of the aspects of the present disclosure is to provide protection for a certain zone of the air space around an object on which or alongside which the described herein system has been installed, against UAVs, including in the air space over a population center. In particular, the invention relates to solutions for the detection and counteracting of unknown UAV in the event of their penetrating a monitored air space. Unknown UAVs are UAVs not having authorization to be in the monitored zone of the air space.

The disclosed system perform at least a detection of a moving and/or flying object using a primary detection module, a capturing of the detected object using a recognition module, a classification of the detected object based on at least one captured image using a control and classification module, an identification of the UAV using a control and classification module in the event that the detected object is determined to be a UAV. The disclosed system also takes steps to counteract the unknown UAV using a neutralization module in the event of no identification of the UAV. The identification of the detected UAV may be done on the basis of "friend or foe" procedures. If the UAV is not identified, then it may be classified as an unknown UAV.

In one aspect of the present disclosure the disclosed solution may be integrated with an operating security system being used at the object around which it is required to provide protection of the air space against UAV. As used herein, the term "object" broadly refers to any kind of installations, such as houses and stadiums, and conditionally designated space, such as an airport.

The first technical result of the present disclosure is to broaden the arsenal of technical means for combating various UAVs, including in the air space over a population center, by probing the air space, detecting and identifying UAVs, and taking measures to remove the detected unknown UAV from the monitored zone of the air space.

The second technical result of the present disclosure is to protect the air space of a protected object, including one located in a population center, against unknown UAVs by means of detection, classification and identification of the UAV, with subsequent removal of unknown UAV from the air space of the protected object, if needed.

As one variant embodiment of the present invention, a method is proposed for counteracting of unknown unmanned aerial vehicles (UAV), wherein the method involves steps in which: a primary detection module may be used to perform the detection of an unknown flying object in a monitored zone of air space. The primary detection module may be used to determine the spatial coordinates of the detected unknown flying object, the determined spatial coordinates may be transmitted to a control and classification module. An image of the detected unknown flying object may be captured using a recognition module. The control and classification module may be used to classify the detected unknown flying object based on an analysis of at least one image obtained from the recognition module. In response to determining the unknown flying object to be a UAV using the control and classification module, the identification of the UAV may be carried out. Upon determining the UAV as being an unknown UAV, a directional radio suppression of the control signal of the UAV may be performed using a neutralization module until such time as the unknown UAV leaves the monitored zone of the air space.

In another aspect of the present disclosure, the protection against UAV may be performed in the airspace of a population center.

In another aspect of the present disclosure, the identification of the unknown UAV may be done by detecting a visual marker, a GPS beacon or RFID tag indicating the ownership of the UAV. In yet another aspect, machine learning models, such as neural networks may be used during the analysis for the classification of the detected unknown object.

In another aspect, the spatial coordinates of the location of the primary detection module are determined prior to the search for flying objects in the air space.

In yet another aspect, the recognition module may include at least one video camera which is used for the capturing of the detected flying object, the capturing being done according to the spatial coordinates of the detected flying object.

In another aspect, the primary detection of the unknown flying object may be done using a LIDAR or a GPS receiver.

In yet another aspect, the recognition module may be mounted on a clewing module, enabling a displacement of the video camera by 360 degrees about its axis.

In another aspect, the recognition module may include at least two video cameras, where one video camera is configured to perform general surveying, and the second video camera enables multiple enlargement of the detected flying object.

As another variant aspect of the present disclosure, a tracking of the detected flying may be performed, during which the second video camera closes in on the detected object in order to obtain at least one image in which the detected flying object is represented with the required resolution, and at least one image is sent to the control and classification module.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
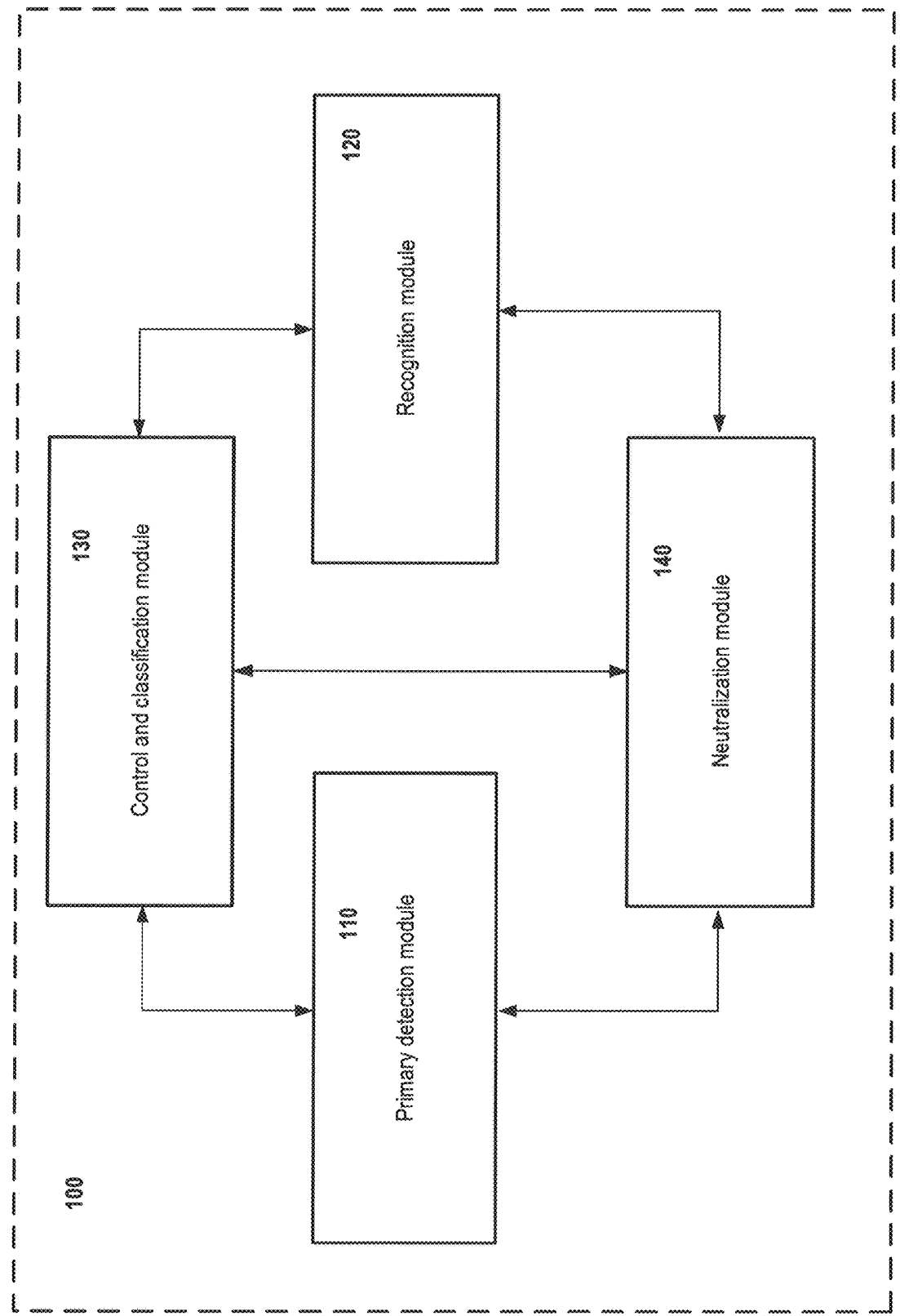
FIG. 1 illustrates the high level architecture of a system for detection and counteracting of UAVs with the possibility of realizing different variant aspects.

Aspects of the present disclosure enable solutions to the shortcomings of the known art by presenting a system and a method for detection and counteracting of unmanned vehicles. As used herein, the term "unmanned vehicles" broadly refers to such kinds of vehicles as ground transportation means and aerial transportation means. Ground transportation means, in a particular aspect, may refer to an self-propelled automobile. Air transportation means, in a particular aspect, may refer to an unmanned aerial vehicle. In a particular aspect of the disclosure, the detection and counteracting may be performed at least with respect to UAVs. One of the advantages of the present disclosure is that the disclosed system may be used in population centers (cities), without causing damage to the infrastructure of the population centers, or to the UAVs themselves. Examples of such damage may include the damage associated with the crashing of the UAV against various objects (such as buildings) and the antennas installed on them. Another example of such damage may include the damage associated with the disruption of the functionality of various devices due to the radio frequency suppression during the steps taken by the system to combat the UAV. In one non-limiting example such suppression may include the suppression of a communication signal between the UAV and its operator. The disclosed system may enable its utilization in urban areas by counteracting of the UAV using a directional radio antenna for combating the UAV, without disabling the onboard control system of the UAV and without limiting the operation of the flight mechanisms of the UAV (such as the screws and propellers), which allows the UAV to not crash against any object.

Another advantage of the present disclosure is the employment of a LIDAR to perform at least the search for and primary detection of flying objects in the monitored air space. Thus, the LIDAR, by performing laser probing of the air space, determines a cluster of points in a particular zone. The determined cluster may then be analyzed to recognize a foreign/unknown flying object.

As noted above, is the disclosed system may be designed to afford protection against various civilian UAVs. Examples of such UAVs may be the quadcopters created by such companies as DJI (models PHANTOM, INSPIRE, MAVIC, M600, S1000), FREEFLY (model ALTA), PARROT and XIAOMI, among many others.

Depending on the various aspects, the present disclosure may be implemented both in a stationary and mobile form, examples of the implementation of which are presented below.

According to aspects of the present disclosure, in order to perform its purpose, it is desirable that the system for detection and counteracting of unmanned vehicles, and in a particular instance UAV, is installed or deployed either directly on the object around which it is necessary to protect the air space against UAV, or alongside that object. As used herein, the term "object needing protection against unmanned vehicles" broadly refers to at least one of the following: some specific structure (such as a stadium, a residence), an entire infrastructure (such as an airport, a sea port, an industrial complex), a population center (such as a city of rural type), a place for holding public events, and the like. Likewise, different variant aspects make it possible to install the disclosed system on an immovable object, such as the roof of a building, or on a movable object, such as an automobile which is outfitted with a place to install the disclosed system. Moreover, the disclosed system is also capable of being integrated with existing security systems which are employed on objects (for example, in airports, harbors, and stadiums). After deploying the system for protection of the air space of an object against unmanned vehicles, and in a particular instance UAV, the system may be launched in unmanned vehicle search mode, especially for UAV. The disclosed system also has the capability of adjusting functionality in accordance with the requirements of the location where the system is situated. Examples of such requirements may include, but are not limited to, climatic conditions, a designated zone of air space and its boundaries.

In different aspects, the detection and/or neutralization of several flying objects, including UAVs, in a monitored zone may be performed either in sequence or simultaneously, depending on a particular configuration of the installed system. In addition, the disclosed system is capable of performing the neutralization of a particular unmanned vehicle. To perform the neutralization of a particular unmanned vehicle, the disclosed system may obtain information about at least the kind and/or type of unmanned vehicle against which a particular zone of space needs to be protected.

Furthermore, it will be understood that the present disclosure is not limited to the examples shown in the figures. More specifically, the functionality of the disclosed system is not limited to protection against UAVs, and it may also be used in a similar manner to protect against other kinds of unmanned vehicles.

FIG. 1 shows schematically the system for detection and counteracting of UAV 100. In a preferred aspect, the system for detection and counteracting of UAV 100 (hereinafter, the system of protection against UAV 100) may include at least the following modules: a primary detection module 110, a recognition module 120, a control and classification module 130 and a neutralization module 140. Moreover, each module uses software enabling their interaction with each other and the performance of their function.

The primary detection module 110 may be configured to detect any moving and/or flying object in the air space with subsequent determination of the spatial coordinates of the detected moving and/or flying object. The primary detection module 110 may be configured to interact at least with the control and classification module 130. The interaction between these modules may include the transmittal of the data determined during the probing of the air space and the coordinates determined for the detected objects. The coordinates may include at least an azimuth orientation of the detected unknown flying object, the altitude of the detected unknown flying object and the distance to the detected unknown flying object.

It should be noted that the capabilities of the search for and detection of a flying object may be limited either by the technical capabilities of the devices used to make the primary detection module 110 in the implementation of the system of protection against UAV 100, or by the defined boundaries of the air space monitoring zone. Depending on the implementation and configuration of the primary detection module 110, the detection of several flying objects may be done either simultaneously or sequentially (one at a time).

The primary detection module 110 may be configured to include a GPS (Global Positioning System) device and at least one of the following devices:

a LIDAR device delivering a laser beam capable of probing a target in the air space;

a video camera, for example, a wide-angle video camera;

an audio receiver, such as a microphone;

a radio frequency device (radar).

The aforementioned devices may contain software allowing them to obtain the necessary information and interact with other modules of the system of protection against UAV 100. Such software may be designed and configured based on various aspects of the system of protection against UAV 100. It should be noted that the design and configuration of such software is outside the bounds of the present disclosure. In a preferred aspect, the primary detection module 110 may include an omnidirectional LIDAR, which may perform a search for UAV using laser probing, in coordination with a GPS receiver. The laser probing may be carried out in a scanning sector from 0 to 360 degrees along the horizontal axis and a scanning angle from 0 to 90 degrees along the vertical axis. The window along the vertical axis may attain at least 45 degrees. Depending on various aspects, the distance to the UAV at which the UAV can be detected by the disclosed system may vary in the range, for example, from, about 0.2 km to about 5 km. At the same time, depending on the technical capability of the primary detection module 110 the detection distance can be either increased or decreased as needed.

In yet another aspect, the primary detection module 110 may include a LIDAR, a GPS receiver, and at least one video camera. In this particular aspect, the primary detection may be achieved jointly by the LIDAR and the video camera. It should be noted that the number of video cameras installed depends on the air space zone which needs to be protected, and the necessary scanning sector (from about 0 degrees to about 360 degrees). Thus, for example, 10 (ten) video cameras installed in a circle may meet the requirement of all-round visibility. Video cameras connected to each other may communicate at least with the control and classification module 130, which enables a searching for UAV in parallel with the LIDAR.

In yet another aspect, the primary detection module 110 may additionally include at least one audio receiver, which may also perform a search for UAV together with the control and classification module 130.

The preliminary tuning/calibration and further controlling of the primary detection module 110 may be done by employing the control and classification module 130. An example of calibration may include the determination of the spatial coordinates of the primary detection module 110 relative to the other modules of the system of protection against UAV 100, or the determination of the spatial coordinates of the primary detection module 110 relative to the object around which it is necessary to protect the air space. Such controlling of the primary detection module 110' may include, for example, the determination of the boundaries of the air space zone around the object needing protection against flights by UAV.

The recognition module 120 may be configured to 1) capture the detected flying object according to the data obtained from the control and classification module 130, where the data may contain information about the spatial coordinates of the detected object, 2) track (observe the movement) of the captured object, and 3) transmit information about the captured object to the control and classification module 130.

In an aspect, the recognition module 120 may include two video cameras installed on a slewing module. A first video camera (e.g., wide-angle video camera) may enable the tracking (video observation) of the object in a wide angle field, and the second video camera may have a narrower angle field. However, the second video camera may have a capability to obtain a higher resolution image of the target object using zoom functionality. In other words, the first video camera may be a so-called general-view camera, while the second camera may be a zoom video camera. In an aspect, the first video camera may be a video camera having a wide angle lens, and the second video camera may be a video camera containing a zoom lens with high variable focal length, making it possible to change the scale of the image of the target object when photographed from the same point.

The control of the slewing module may be performed by the control and classification module 130, which may send control commands to the slewing module to rotate the recognition module 120, for example, the installed video cameras in the direction of the detected flying object. The second video camera may allow to change (enlarge) the scale of the image of the flying object both by optical magnification and/or by digital magnification.

It should be noted that the recognition module 120 may also be configured to perform its function using at least one video camera. In part, the variant aspect may depend on the technical characteristics of the video cameras and the air space zone needing to be protected against UAV. In one aspect, when the primary detection module 110 is configured to have at least one video camera, then the recognition module 120 may contain only a zoom video camera.

In other aspects, the recognition module 120 may consist of or additionally include at least one of the following devices: a photography camera and a device having infrared thermal imaging and/or night vision function. Moreover, the recognition module 120 may also include additional devices facilitating detection, surveillance, and information gathering about the flying object in the air space for subsequent analysis.

The control and classification module 130 may be further configured to process the data obtained from the primary detection module 110 and the recognition module 120, control the clewing module and the modules 110, 120 and 140. The control and classification module 130 may be also configured to classify the detected flying object, where the classification may include at least an analysis of the data obtained from the recognition module 120. In one aspect, the control and classification module 130 may employ a neural network, such as, for example, an artificial neural network (ANN), to make a decision on whether the detected object corresponds to a certain UAV type. As the data presented for analysis, the recognition module 120 may provide various images of the target object, depending on the device with which such images are produced. Thus, for example, the video camera may provide at least one video frame, while the photography camera in turn may provide a photograph. In response to determining the detected object to be a UAV, the control and classification module 130 may send a request to the neutralization module 140 to counteract the detected UAV.

The "neural network", in the context of the present disclosure may be used primarily to detect objects in various images and may be used to classify the detected objects. The images may be, for example, video frames obtained at least from the recognition module 120. The neural network employed by the control and classification module 130 for analysis of the video frames may be a previously trained neural network and may also have the capability to learn on-the-fly in the course of its operation. The neural network may be trained using a prepared list of annotated video frames representing examples of different flying objects of interest, including, but not limited to, UAVs of different kinds and types operating in different climatic conditions, with different foreshortening direction angles and with different background illumination. In one particular aspect, a convolutional neural network (CNN) may be used by the control and classification module 130, enabling an effective recognition of objects in the analyzed images.

In an aspect, the control and classification module 130 may be a server (such as a Graphics Processing Unit "GPU" server). In a general case, a server implementation may be understood as being a computer system, such as the one described below in conjunction with FIG. 7. A computer system may be understood as being either a personal computer, such as a desktop computer, a notebook and a netbook, or an electronic device with wireless communications, such as a mobile telephone, a smartphone and a tablet. The computer system may include various software, such as, but not limited to: hardware, program and/or system software.

The neutralization module 140 may be configured to combat the detected UAV. As used herein, the term "combat" generally refers to escorting the UAV out from the monitored air space. In an aspect, at least one antenna may be used by the neutralization module 140 that may be configured to enable a directional radio suppression of the control signal used to control the detected UAV. The radio suppression may be performed continuously until the UAV leaves the monitored zone of the air space. The antenna used by the neutralization module 140 may produce the radio suppression at least in a certain range (such as from about 20 degrees to about 25 degrees). The employed antenna(s) may be capable of jamming the control signal at a given distance, in a particular frequency range. Thus, for example, the suppression distance of the UAV may be at least 600 meters, the suppression power may be at least 100 MW, and the frequency range in which the antenna emits may include at least the following frequencies: 900 MHz, 1.2 GHz, 2.4 MHz, 5.8 GHz, L1 and L2, while the suppression of the signal of the communication channel of the UAV may be achieved using a source of white noise, without jamming the GPS receiver of the UAV.

In one aspect, the neutralization module 140 may be arranged together with the recognition module 120 on the turntable of the clewing module, making it possible to change the position of the modules in accordance with the movement of the detected flying object.

Various aspects of the present disclosure include both a stationary and a mobile implementation. Moreover, in one aspect the disclosed system of protection against UAV 100 can be integrated with an existing security system used at the object around which the air space needs to be protected against UAV.

When integrating the system of protection against UAV 100 with the aforementioned security system, an adaptation of the system of protection against UAV 100 can be done using the control and classification module 130. During this adaptation all available devices of the security system may be determined, such as additional video cameras. Furthermore, all devices of both systems may be attuned for a joint operation of the detected devices and the aforementioned modules of the system of protection against UAV 100. It should be noted that, when integrating the system of protection against UAV in a security system, the control and classification module 130 may be integrated using the control server of the security system, by installing at least the software including the neural network.

Figure 2:
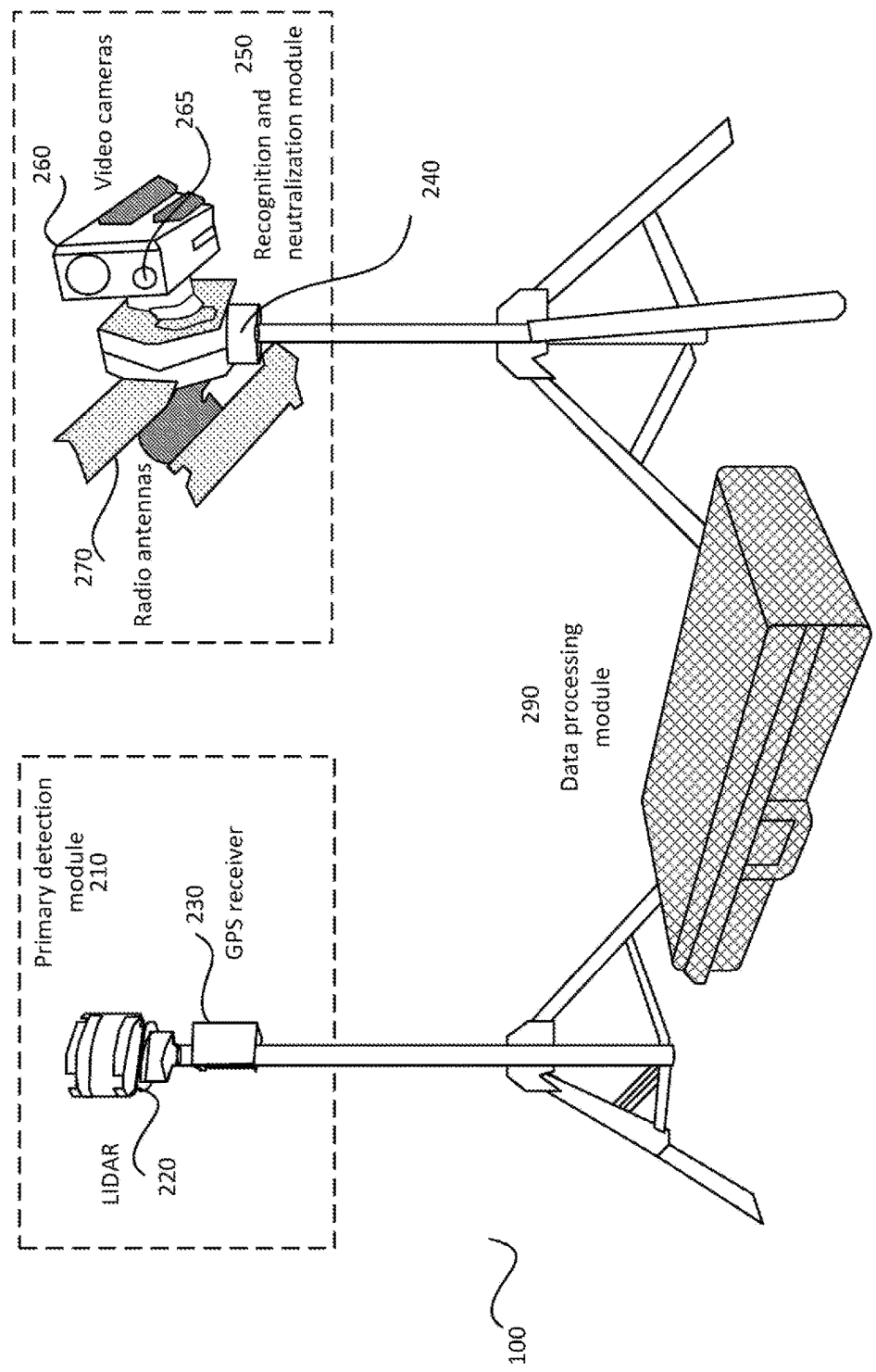
FIG. 2 illustrates an example of a prototype of a stationary aspect of the system for detection and counteracting of UAV in the air space over a population center.

The working scenario of the proposed system 100 is presented in a description of one aspect illustrated in FIG. 2.

FIG. 2 illustrates an example of a prototype of the stationary version of the system of protection against UAV 100. Thus, the system of protection against UAV 100 may include at least a primary detection module 210, a recognition and neutralization module 250 and a data processing module 290. In turn, the primary detection module performs the functions of the primary detection module 110 described above in conjunction with FIG. 1 and may include a LIDAR 220, a GPS receiver 230 and a magnetometer (not shown in FIG. 2). The recognition and neutralization module 250 may perform the combined functions of the recognition module 120 and the neutralization module 140 described above in conjunction with FIG. 1. The recognition and neutralization module 250 may be mounted on the clewing module 240. In this example, the recognition and neutralization module 250 may be implemented as two video cameras: a first video camera (general-view video camera) 260 and a second video camera (video camera with zoom functionality) 265. The recognition and neutralization module 250 may further include a group of radio antennas 270. The group of radio antennas 270 may contain antennas for radio suppression, where each antenna works on a certain radio frequency. The frequencies or frequency range may be determined according to the frequencies on which the UAVs operate. The data processing module 290 may be configured to perform the tasks and functions of the control and classification module 130 (shown in FIG. 1). In this example, the data processing module 290 may comprise a server, containing a computer system capable of processing a large volume of data, in particular graphics data. In an aspect, the data processing module 290 may be incorporated in an individual housing. Such implementation enables sufficient mobility and ergonomic effectiveness of the system of protection against UAV 100. Communication between the primary detection module 210, recognition and neutralization module 250 and data processing module 290 may be provided at least by wired communication (cable connections).

All of the indicated modules of the system of protection against UAV 100 may be first installed either directly on the object around which the air space needs to be protected against UAV or alongside it. The system of protection against UAV 100 may then be started in UAV search mode. If necessary, a setting up of the system of protection against UAV 100 in accordance with the geographical location may also be performed. Thus, for example, the setting up may involve at least one of the following:

determination of the spatial coordinates of the system of protection against UAV 100 and its modules relative to each other, if the modules are separated, in particular the primary detection module 210 and the recognition and neutralization module 290;

determination of the boundaries of the zone of air space in which protection against flights of UAV will be provided;

setting up of the data processing used by the data processing module 290 in its neural network classification/computations, where the set-up may also include training the neural network in accordance with the operating conditions of the system of protection against UAV 100;

formation of the air space zone of UAV searching for the object being protected;

formation of the region in the monitored zone of air space needing to be protected against UAV;

generation of a location map of objects in the monitored zone of air space using the primary detection module 210, especially with the help of the LIDAR 220.

Thus, the system of protection against UAV 100 may be launched in search mode for flying objects in the monitored zone of the air space.

Whenever any flying object appears in the monitored zone of air space, the primary detection module 210 may detect it using the LIDAR 220 and may determine the coordinates of the detected flying object. The primary detection module 210 may be further configured to send the determined coordinates to the data processing module 290.

Figure 3:
FIG. 3 shows an example of the primary detection of an unknown object in the monitored zone of an air space, in accordance with aspects of the present disclosure.

In one variant aspect, the process of detection of a flying object may include the following steps. The LIDAR 220 may perform a laser probing of the air space during which information is transmitted to the data processing module 290. The information provided by the LIDAR 220 may contain data on the position of various objects in the monitored zone of the air space in the form of points. The positions of various points may be generated based on the reflection of the laser beams from various surfaces, including those of the objects. The data processing module 290 may determine the presence of a flying object based on an analysis of the information received from the LIDAR 220. In yet another aspect, in which a map has been generated representing the zone of air space, the analysis may be performed using the generated map. Next, the LIDAR 220 in concert with the GPS receiver 230 may determine the spatial coordinates of the detected flying object, and may also then track the movement of the detected flying object. The obtained data may be transmitted in real time to the data processing module 290. An example of the detection and image capturing of a flying object using the LIDAR 220 is presented in FIG. 3, where a flying object is detected in the square.

Referring back to FIG. 2, next, the data processing module 290 may send a command to the clewing module, which may perform a rotation so that the recognition and neutralization module 250 is aimed in the direction of the unknown detected flying object. The data processing module 290 may also send the coordinates of the flying object to the recognition and neutralization module 250.

The recognition and neutralization module 250, using at least one of the aforementioned video cameras, may capture an image of the unknown detected flying object and then may track the detected flying object's flight movement. During the tracking of the detected flying object, the recognition and neutralization module 250 may perform a zooming on the mentioned target object using the second video camera having zoom functionality 265. These steps may provide at least one digital video frame with the detected object that may be used for its further identification. As noted above, the second video camera 265 may be a video camera containing a lens with high variable focal length, making it possible to change the scale of the image of the object during its photographing from a single point. The second video camera 260 may be a video camera with a wide angle lens. The second video camera 260 may be configured to determine and track the direction of movement of the flying object, e.g., in order not to lose the flying object from sight. It should be mentioned that capturing an image of the flying object may be done in several ways when the mentioned two video cameras 260 and 265 are present in the implementation of the recognition and neutralization module 250. First, the image capturing may be done simultaneously by both video cameras. Second, the image capturing may be done at first by the first (general-view) video camera 260, and then a correction may be performed by the second video camera 265. Third, the image capturing can be done at first by the second video camera 265, which may continue to track (monitor the movement of) the detected object. Later on, the recognition and neutralization module 250 may use the first video camera 260 for guidance, if necessary. The effectiveness of each approach of capturing an image of the flying object may depend on the distance to that flying object and the speed of movement of the flying object. It should be noted that the term "capturing an image of the object" refers herein to at least an intermediate stage in the process of processing the information on the object between the stages of detection and tracking.

Figure 4:
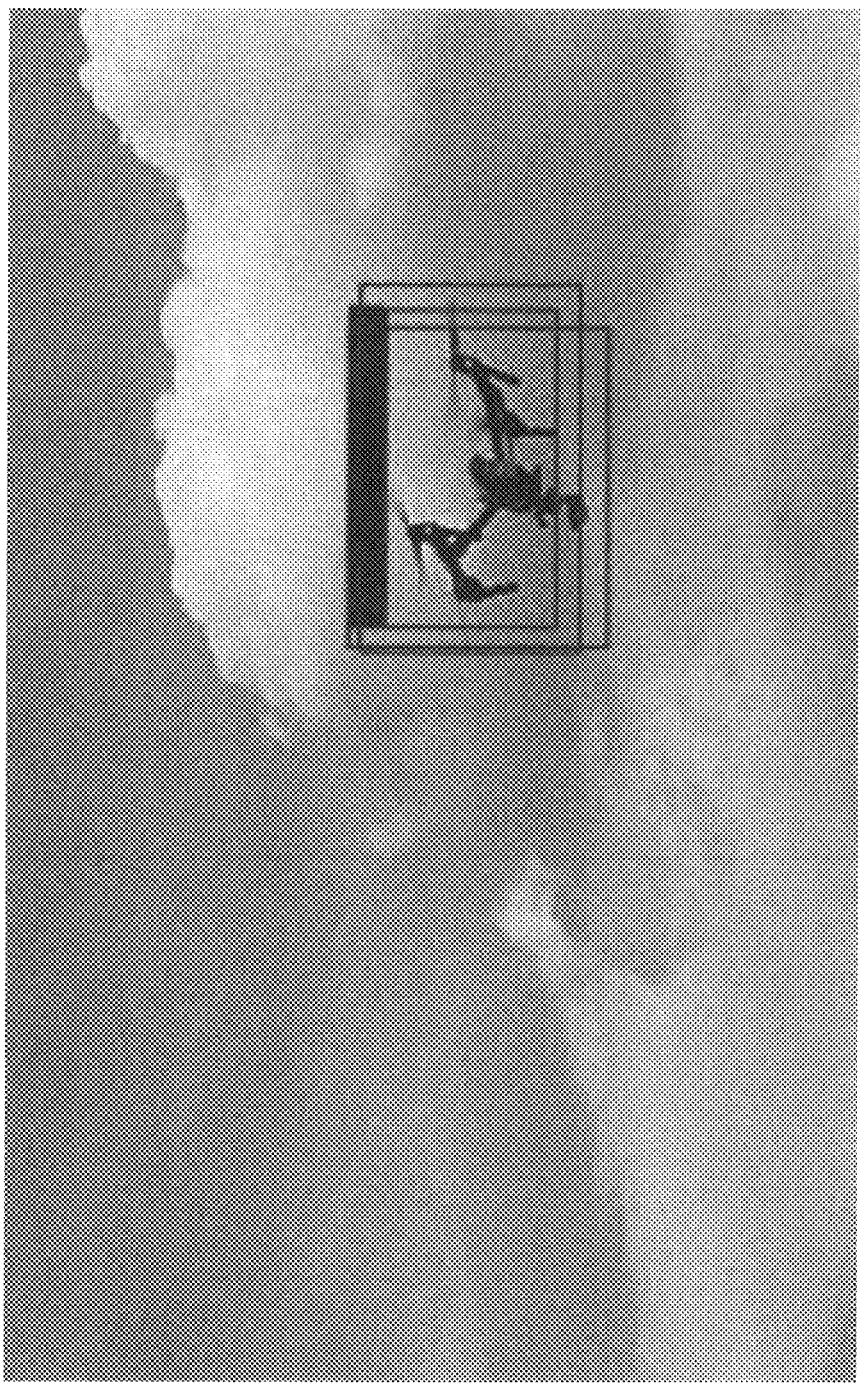
FIG. 4 shows an example of the capturing of an unknown object using a video camera having a zoom functionality.

In an aspect, the second video camera 265 may at first use the middle point of the distance to the object in order to at least capture the flying object (for example, in the form of a point) in video frames. After capturing the first image, the necessary change in scale can be done to magnify the flying object in the video frames. An example of capturing an image of an unknown flying object using the video camera having zoom functionality 265 is presented in FIG. 4. FIG. 4 shows the captured flying object after zooming operation has been performed. It should be noted that the use of two different video cameras within the recognition and neutralization module 250 enables a guaranteed focusing on the unknown flying object with a high degree and allows tracking of the unknown flying object during its movement.

In other aspects, the first video camera 260 may also generate video frames with the captured unknown flying object and transmit the generated video frames to the data processing module 290.

After capturing the image, the recognition and neutralization module 250 may transmit at least one video frame with the captured object to the data processing module 290. It should be noted that in this process the scale of the image of the flying object may be adjusted to produce at least one high-quality video frame. The need to change the scale (zoom in or zoom out) may be determined by the data processing module 290 depending on the analysis of the video frames during the recognition of the detected flying object.

In one aspect, the data processing module 290 may perform an analysis of the obtained data using a neural network. The employed neural network may receive at least one video frame obtained from the recognition and neutralization module 250 as an input, in order to classify the unknown detected flying object. The input data may include at least video frames received from at least one of the first video camera 260 and/or second video camera 265, as well as information from other devices employed by the recognition and neutralization module 250 or the primary detection module 210. Such devices may include at least a LIDAR, an audio receiver, and a radar. Using the results of the analysis performed by the neural network, the data processing module 290 may produce a decision as to whether the unknown detected flying object conforms to at least one type of UAVs or a specific model of UAV. If the detected flying object is determined to be a UAV, the data processing module 290 may send a signal to the recognition and neutralization module 250, indicating the need to counteract the detected UAV.

As noted above, the recognition and neutralization module 250 may also employ a group of radio antennas 270. In response to receiving a signal from the data processing module 290, the recognition and neutralization module 250 may orient the radio antennas 270 at the detected UAV and may perform a directional radio suppression of the UAV. In particular, the recognition and neutralization module 250 may perform a suppression of the control signal of the detected UAV, until the UAV leaves the monitored air space. The type of radio frequency used or the desired range of radio frequencies for the jamming may also be received by the recognition and neutralization module 250 from the data processing module 290. The data processing module 290 may determine the type of radio frequencies and the desired range based on the identified UAV. The recognition and neutralization module 250 may effectively complete its mission when the detected UAV is removed from the monitored zone of the air space.

In a particular aspect of the system of protection against UAV 100, upon simultaneous detection of two or more unknown flying objects by the primary detection module 210, a prioritization may be done using the data processing module 290 to make a decision as to the order of the classification of the unknown flying objects, as well as their subsequent neutralization, if necessary. The prioritization may be performed based at least on a comparison of the distance to the detected flying objects and their speed of approach.

In yet another aspect of the system of protection against UAV 100, after determining an unknown flying object to be a UAV, the disclosed system may optionally identify the affiliation of the UAV and/or its ability to be in the monitored zone of air space. For this, a "friend or foe" technique may be used. Thus, for example, the system of protection against UAV 100 may perform an additional analysis for the identification of the UAV. The additional analysis may be based on the ability to identify on the body of the UAV visual markings, the use of infrared emitters, RFID (Radio Frequency IDentification) tags or GPS beacons. Accordingly, depending on the detection of one of the aforementioned identifiers, the UAV can be identified as "friend" or "foe". For example, if the UAV has a GPS beacon, the system of protection against UAV 100 may obtain the coordinates from that UAV and may identify the UAV based on the coordinates. If it is determined that the UAV has permission to be in the monitored zone, no counteracting will be performed by the system. Otherwise, if the UAV is identified as unknown, a counteracting may be performed as described above.

In other aspects, the system of protection against UAV 100 may include two or more primary detection modules 210 and recognition and neutralization modules 250. In this case, the system of protection against UAV 100 may also enable the capturing and simultaneous neutralization of two or more detected UAVs.

In yet another aspect, the monitored zone of air space may be divided into sectors according to distance from the object being protected. Based on the divided sectors, the system of protection against UAV 100 may determine which module performs its function. For example, the primary detection module 210 may perform the search for flying objects in all sectors, while the recognition and neutralization module 250 may only cover nearby sectors. The nearby sectors may be determined based on the distance at which the recognition and neutralization module 250 can perform its function. The sectors and the configuration of one module or another of the system of protection against UAV 100 may be set up depending on modules' technical capabilities and depending on the need for protection against UAV in one sector or another of the monitored zone of air space.

Figure 5:
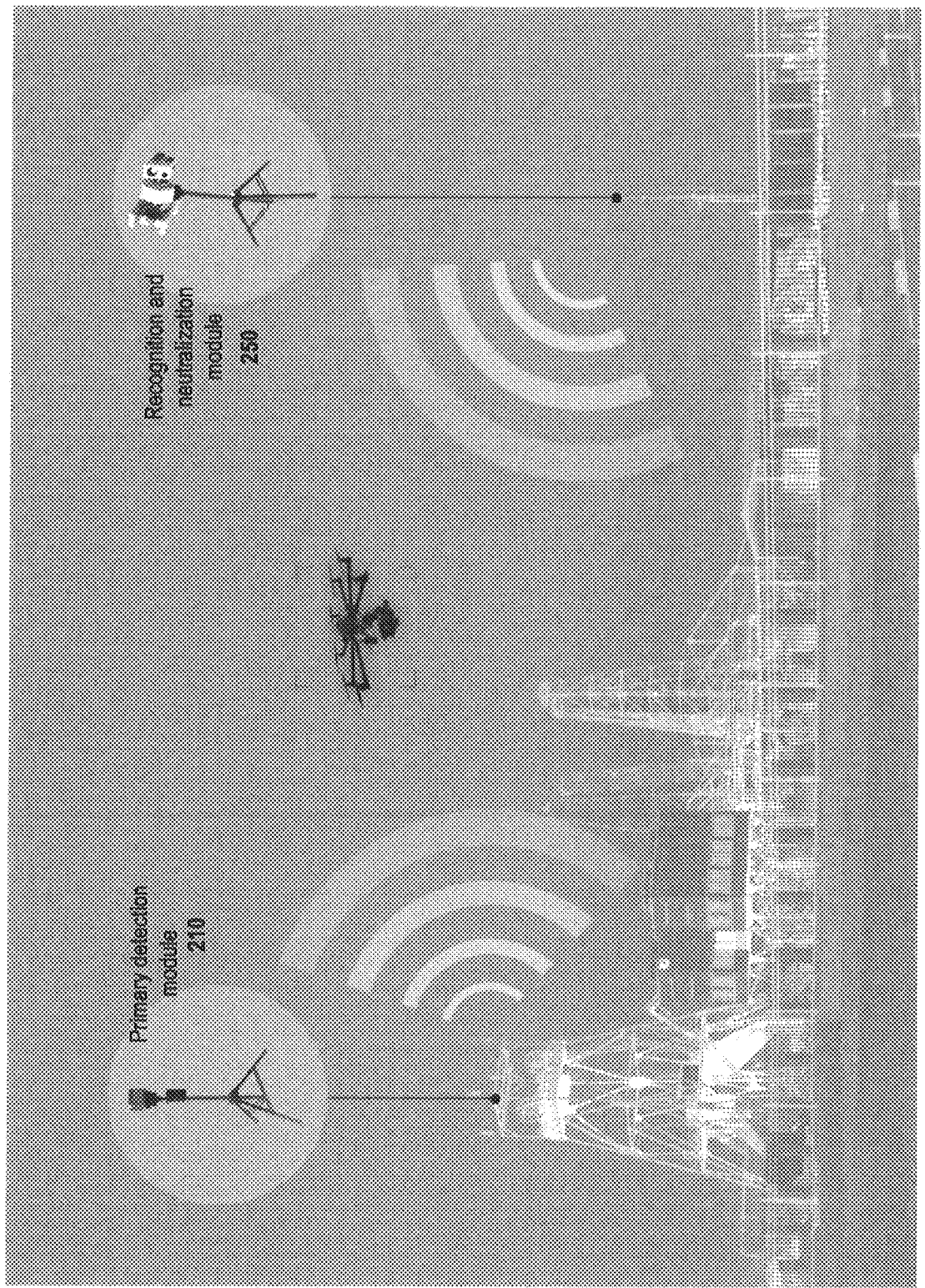
FIG. 5 shows an example of the location of the modules of a system of protection against UAVs at an industrial object.

FIG. 5 shows an example of the location of the modules of a system of protection against UAVs at an industrial object. In this example, modules 210 and 250 are spaced apart in the monitored zone at an industrial object. It should be noted that the separation of the modules as well as their number depends on the industrial object itself that needs to be protected and on the technical capabilities of the respective modules. For example, the industrial complex shown in FIG. 5 is located on a large territory. Therefore, in order to effectively protect the industrial complex, it is desirable to distribute the modules. In particular, the number of modules 250 may not be limited to one and may be increased to four, for example. When placing modules 250, they can be installed at different corners of the industrial object in four directions.

Figure 6:
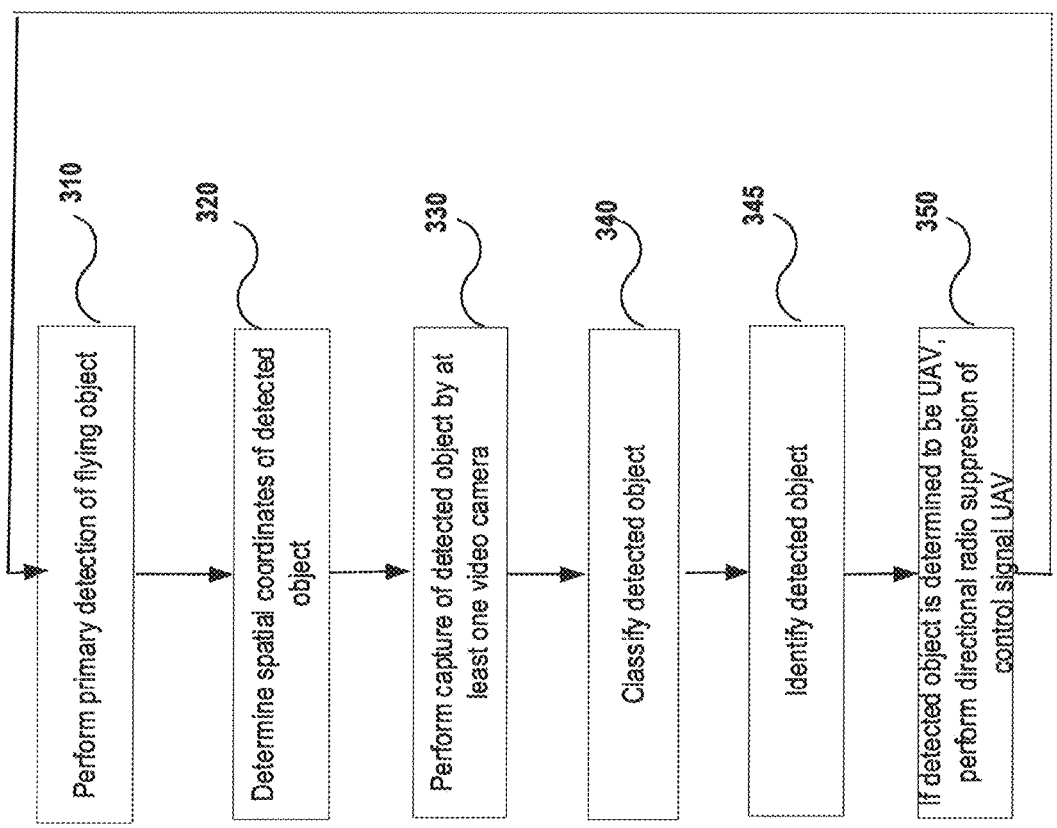
FIG. 6 illustrates a flow diagram of the method of protection against UAV in the air space over a population center.

FIG. 6 illustrates a flow diagram of the method of protection against UAV in the air space over a population center. In step 310, the primary detection module 110 performs the primary detection of a flying object in the monitored zone of an air space. The primary detection may be performed using at least a LIDAR 220, which may perform the search by laser probing the air space. In this step, the LIDAR 220 may only enable a detection of a flying object, but not its recognition. Therefore, at this point, all detected flying objects are also unknown flying objects. In response to detecting at least one flying object in the monitored zone of air space, step 320 may begin.

In step 320, the primary detection module 110 may determine the spatial coordinates of each detected flying object and may send the determined spatial coordinates to the control and classification module 130. This spatial coordinates of a detected flying object may include at least an azimuth orientation of the detected unknown flying object, the altitude of the detected unknown flying object and the distance to the detected unknown flying object. The control and classification module 130 may send the received coordinates to the recognition module 120 for capturing an image of the flying object.

In step 330, the recognition module 120 may capture an image of the detected flying object using at least one video camera of the recognition module 120. After the image is captured, the flying object may be tracked and video frames with the captured flying object may be generated by the recognition module 120. The recognition module 120 may send the captured image(s) to the control and classification module 130. In a preferred aspect, the image capturing may be performed using two video cameras, where the first video camera is a video camera with wide-angle lens 260, and the second video camera is a video camera having zoom functionality 265. The two video cameras enable capturing of images of the flying object and transmittal of video frames.

In step 340, the control and classification module 130 may be used to classify the detected object based on an analysis of at least one video frame from the video frames obtained with at least one video camera. For the classification of the detected object, the control and classification module 130 may use a neural network in the analysis of the video frames. The neural network may be previously trained by a list of annotated test images, representing different flying objects at various foreshortenings and with various backgrounds. The neural network may be used to analyze each obtained video frame and may generate a decision as an output. The generated decision may contain information about the affiliation of a particular flying object, including UAV. Moreover, if the flying object is determined to be a UAV, the decision may also contain information about the type and model of UAV. In a particular aspect, if the flying object is determined to be an unknown object, the control and classification module 130 may either output the generated decision to the operator of the system of protection against UAV and may wait for a response, or the control and classification module 130 may perform an additional analysis, which may be based on an analysis of the probabilities of the flying object belonging to a particular type of object. Based on this additional analysis, the control and classification module 130 may then generate a further decision as to whether the unknown object is a UAV. In yet another aspect, the control and classification module 130 may request additional video frames and may analyze them using the neural network until it can classify the detected flying object. In this case, if the detected flying object is determined to be a UAV, step 350 may be performed.

In step 350, if the object is determined to be a UAV, a directional radio suppression for the control signal of the UAV may be performed by the neutralization module 140 until the UAV leaves the monitored zone of the air space. The suppression may be achieved using a list of radio antennas, such as the radio antennas 270. After the removal of the detected UAV from the monitored zone of the air space, the suppression may be halted. The system of protection against UAV 100 may continue further searching for flying objects.

In a particular aspect, if the control and classification module 130 determines an unknown detected flying object as being a UAV, in an optional step 345, an identification of the UAV may be carried out by the control and classification module 130. The identification of the UAV may include the determination of whether the UAV belongs to the UAV which are authorized to fly in the monitored zone of the air space. The mechanism of identification of the UAV may use, for example, "friend or foe" identification techniques. Depending on the various aspects, visual markers on the body of the UAV, infrared (IR) emitters, RFID tags or GPS beacons may be used by the control and classification module 130 for the identification of the affiliation of the UAV. In the event that the unknown detected UAV belongs to the UAV which are authorized to fly in the monitored zone of the air space, the system of protection against UAV 100 may stop capturing the images and may stop tracking of that UAV, but may allow the UAV to continue its movement in the air space. Otherwise, if the UAV is not identified, step 350 may be performed.

Figure 7:
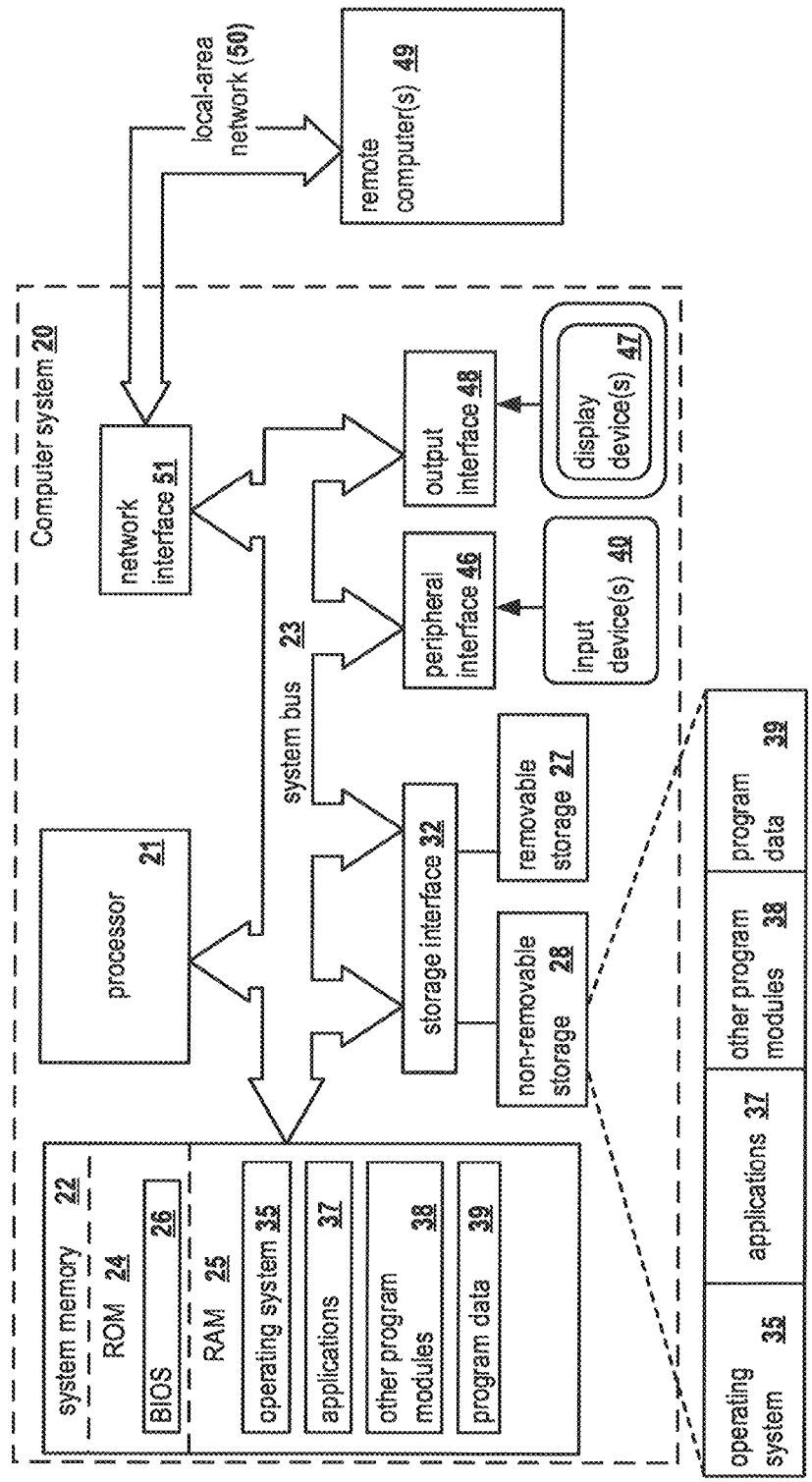
FIG. 7 presents an example of a general-purpose computer system, a personal computer or a server, in accordance with aspects of the present disclosure.

FIG. 7 is a block diagram illustrating a computer system 20 on which aspects of systems and methods for detection of malicious files may be implemented in accordance with an exemplary aspect. The computer system 20 may represent the system of protection against UAV 100 from FIG. 1 and FIG. 2 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for protecting against unmanned aerial vehicles (UAV)s, the method comprising:
    detecting a flying object in a monitored zone of air space using a primary detection module having a Global Positioning System (GPS) device, a light identification, detection and ranging (LIDAR) device, a radar, an audio receiver and at least one camera, wherein the primary detection module is configured to probe airspace to obtain information associated with the detected unknown flying object;
    determining spatial coordinates of the detected flying object;
    capturing one or more images of the detected unknown flying object based on the determined spatial coordinates using a recognition module having a first camera comprising a wide angle video camera and a second camera having zoom functionality, wherein at least one camera of the first and second cameras are attached to a slewing base and wherein the slewing base is configured to rotate the at least one camera by about 360 degree about camera's axis, wherein the recognition module is configured to change scale of the images of the unknown flying object captured by the first camera and the second camera;
    analyzing the captured one or more images using the control and classification module employing an artificial neural network to classify the detected unknown flying object;
    determining, based on the analyzed one or more images, whether the detected flying object comprises a UAV; and
    in response to determining that the detected flying object comprises a UAV, suppressing one or more radio signals exchanged between the UAV and a user of the UAV until the UAV departs from the monitored zone of air space.

2. The method of claim 1, further comprising tracking the detected unknown flying object.

3. The method of claim 1, wherein the classification of the detected unknown flying object is performed using a trained neural network.

4. The method of claim 1, further comprising identifying the UAV, in response to determining that the detected unknown flying object comprises a UAV.

5. The method of claim 4, wherein identifying the UAV further comprises detecting at least one of a visual marker, GPS (Global Positioning System) beacon, or RFID (Radio Frequency IDentification) tag indicating the ownership of the UAV.

6. The method of claim 1, wherein the detected UAV comprises a UAV not authorized to be travelling in the monitored zone of the air space.

7. A system for protecting against unmanned aerial vehicles (UAV)s, the system comprising:
    a hardware processor configured to:
        detect a flying object in a monitored zone of air space using a primary detection module having a Global Positioning System (GPS) device, a light identification, detection and ranging (LIDAR) device, a radar, an audio receiver and at least one camera, wherein the primary detection module is configured to probe airspace to obtain information associated with the detected unknown flying object;

determine spatial coordinates of the detected flying object;

capture one or more images of the detected unknown flying object based on the determined spatial coordinates using a recognition module having a first camera comprising a wide angle video camera and a second camera having zoom functionality, wherein at least one camera of the first and second cameras are attached to a slewing base and wherein the slewing base is configured to rotate the at least one camera by about 360 degree about camera's axis, wherein the recognition module is configured to change scale of the images of the unknown flying object captured by the first camera and the second camera;

analyze the captured one or more images using a control and classification module employing an artificial neural network to classify the detected unknown flying object;

determine, based on the analyzed one or more images, whether the detected flying object comprises a UAV; and in response to determining that the detected flying object comprises a UAV, suppress one or more radio signals exchanged between the UAV and a user of the UAV until the UAV departs from the monitored zone of air space.

8. The system of claim 7, wherein the hardware processor is further configured to track the detected unknown flying object.

9. The system of claim 7, wherein the classification of the detected unknown flying object is performed using a trained neural network.

10. The system of claim 7, wherein the hardware processor is further configured to identify the UAV, in response to determining that the detected unknown flying object comprises a UAV.

11. The system of claim 10, wherein the hardware processor configured to identify the UAV is further configured to detect at least one of a visual marker, GPS (Global Positioning System) beacon, or RFID (Radio Frequency IDentification) tag indicating the ownership of the UAV.

12. The system of claim 7, wherein the detected UAV comprises a UAV not authorized to be travelling in the monitored zone of the air space.

13. A non-transitory computer readable medium storing thereon computer executable instructions for protecting against unmanned aerial vehicles (UAV)s, including instructions for:

detecting a flying object in a monitored zone of air space using a primary detection module having a Global Positioning System (GPS) device, a light identification, detection and ranging (LIDAR) device, a radar, an audio receiver and at least one camera, wherein the primary detection module is configured to probe airspace to obtain information associated with the detected unknown flying object;

determining spatial coordinates of the detected flying object;

capturing one or more images of the detected unknown flying object based on the determined spatial coordinates using a recognition module having a first camera comprising a wide angle video camera and a second camera having zoom functionality, wherein at least one camera of the first and second cameras are attached to a slewing base and wherein the slewing base is configured to rotate the at least one camera by about 360 degree about camera's axis, wherein the recognition module is configured to change scale of the images of the unknown flying object captured by the first camera and the second camera;

analyzing the one or more captured images using the control and classification module employing an artificial neural network to classify the detected unknown flying object;

determining, based on the analyzed one or more images, whether the detected flying object comprises a UAV; and in response to determining that the detected flying object comprises a UAV, suppressing one or more radio signals exchanged between the UAV and a user of the UAV until the UAV departs from the monitored zone of air space.

14. The non-transitory computer readable medium of claim 13, further including instructions for tracking the detected unknown flying object.

* * * * *